US012659420B2

(12) United States Patent
Park et al.

(10) Patent No.: US 12,659,420 B2
(45) Date of Patent: Jun. 16, 2026

(54) IMAGE OUTPUT APPARATUS INCLUDING A PLURALITY OF PROJECTION PARTS AND CONTROL METHOD THEREOF

(71) Applicant: SAMSUNG ELECTRONICS CO., LTD., Suwon-si (KR)

(72) Inventors: Jaesung Park, Suwon-si (KR); Younghoon Jeong, Suwon-si (KR); Youngsu Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/242,329

(22) Filed: Sep. 5, 2023

(65) Prior Publication Data

US 2024/0040077 A1     Feb. 1, 2024

Related U.S. Application Data

(63) Continuation of application No. PCT/KR2023/006145, filed on May 4, 2023.

(30) Foreign Application Priority Data

Jul. 26, 2022    (KR) ........................ 10-2022-0092587

(51) Int. Cl.
*H04N 5/74*        (2006.01)
*G06T 5/92*        (2024.01)
            (Continued)

(52) U.S. Cl.
CPC ................. *H04N 5/74* (2013.01); *G06T 5/92* (2024.01); *G06T 7/20* (2013.01); *G06T 7/50* (2017.01); *G06V 10/60* (2022.01)

(58) Field of Classification Search
CPC ........ H04N 9/31; H04N 9/317; H04N 9/3141; H04N 9/3147; H04N 9/3182;
            (Continued)

(56) References Cited

U.S. PATENT DOCUMENTS

| | | | |
|---|---|---|---|
| 6,553,168 B2 | 4/2003 | Saccomanno | |
| 7,252,387 B2 | 8/2007 | Raskar et al. | |

(Continued)

FOREIGN PATENT DOCUMENTS

| | | |
|---|---|---|
| JP | 2006-165949 A | 6/2006 |
| JP | 2008-533501 A | 8/2008 |

(Continued)

OTHER PUBLICATIONS

Communication issued on May 30, 2025 by the European Patent Office in European Patent Application No. 23846756.7.

(Continued)

*Primary Examiner* — Sultan Chowdhury
(74) *Attorney, Agent, or Firm* — Sughrue Mion, PLLC

(57)                ABSTRACT

An image output apparatus includes a communication interface comprising a circuit; a first projector; a second projector; a first driver configured to adjust a first projection location of the first projector; a second driver configured to adjust a second projection location of the second projector; and at least one processor configured to: identify context information of an input image received through the communication interface; identify a screen layout from a plurality of screen layouts, based on the context information; control, according to the screen layout, the first driver such that the first projector projects a first image to the first projection location; and control, according to the screen layout, the second driver such that the second projector projects a second image to the second projection location.

20 Claims, 11 Drawing Sheets

100

(51) Int. Cl.
  *G06T 7/20*      (2017.01)
  *G06T 7/50*      (2017.01)
  *G06V 10/60*      (2022.01)

(58) Field of Classification Search
  CPC .. H04N 9/3185; H04N 9/3188; H04N 9/3194;
          H04N 5/74; G03B 21/00; G03B 21/14;
             G03B 21/142; G03B 21/145; G03B
             21/147; G03B 21/2053; G06V 10/60;
             G06T 5/92; G06T 7/20; G06T 7/50
  See application file for complete search history.

(56) References Cited

U.S. PATENT DOCUMENTS

| | | | |
|---|---|---|---|
| 8,459,803 | B2 | 6/2013 | Plut |
| 8,684,533 | B2 | 4/2014 | Whitehead et al. |
| 8,702,246 | B2 | 4/2014 | Kurosawa |
| 9,225,950 | B2 | 12/2015 | Lee et al. |
| 9,759,554 | B2 | 9/2017 | Ng et al. |
| 10,969,742 | B2 | 4/2021 | Gorny et al. |
| 2002/0063854 | A1 | 5/2002 | Flint |
| 2005/0094110 | A1* | 5/2005 | Nakamura ......... H04N 21/4318 |
| | | | 348/E5.12 |
| 2005/0116968 | A1 | 6/2005 | Barrus et al. |
| 2006/0209268 | A1 | 9/2006 | Raskar et al. |
| 2009/0257031 | A1 | 10/2009 | Carroll |
| 2010/0171930 | A1 | 7/2010 | Kurosawa |
| 2010/0177167 | A1 | 7/2010 | Hu |
| 2013/0162521 | A1 | 6/2013 | Lee et al. |
| 2015/0138240 | A1* | 5/2015 | Hiranuma ............ H04N 9/3194 |
| | | | 345/634 |
| 2017/0329208 | A1 | 11/2017 | Takahashi |
| 2019/0281266 | A1 | 9/2019 | Urano |
| 2020/0169706 | A1* | 5/2020 | Mori .................... H04N 9/3185 |
| 2021/0302810 | A1* | 9/2021 | Kinoshita ............ H04N 9/3194 |
| 2022/0385869 | A1* | 12/2022 | Masuda ................... G09G 5/00 |
| 2023/0007231 | A1 | 1/2023 | Kadam |
| 2023/0040505 | A1* | 2/2023 | Chae ................... H04N 9/3185 |

FOREIGN PATENT DOCUMENTS

| | | | |
|---|---|---|---|
| JP | 2010-160270 | A | 7/2010 |
| JP | 2011-248238 | A | 12/2011 |
| JP | 2017-3925 | A | 1/2017 |
| JP | 6251871 | B2 | 12/2017 |
| JP | 2019-161397 | A | 9/2019 |
| KR | 10-2003-0019392 | A | 3/2003 |
| KR | 10-2012-0031052 | A | 3/2012 |
| KR | 10-2013-0072748 | A | 7/2013 |
| KR | 10-2019-0060949 | A | 6/2019 |
| WO | 2021/106379 | A1 | 6/2021 |

OTHER PUBLICATIONS

International Search Report (PCT/ISA/210) issued on Jul. 26, 2023 by the International Searching Authority in International Patent Application No. PCT/KR2023/006145.
Written Opinion (PCT/ISA/237) issued on Jul. 26, 2023 by the International Searching Authority in International Patent Application No. PCT/KR2023/006145.

\* cited by examiner

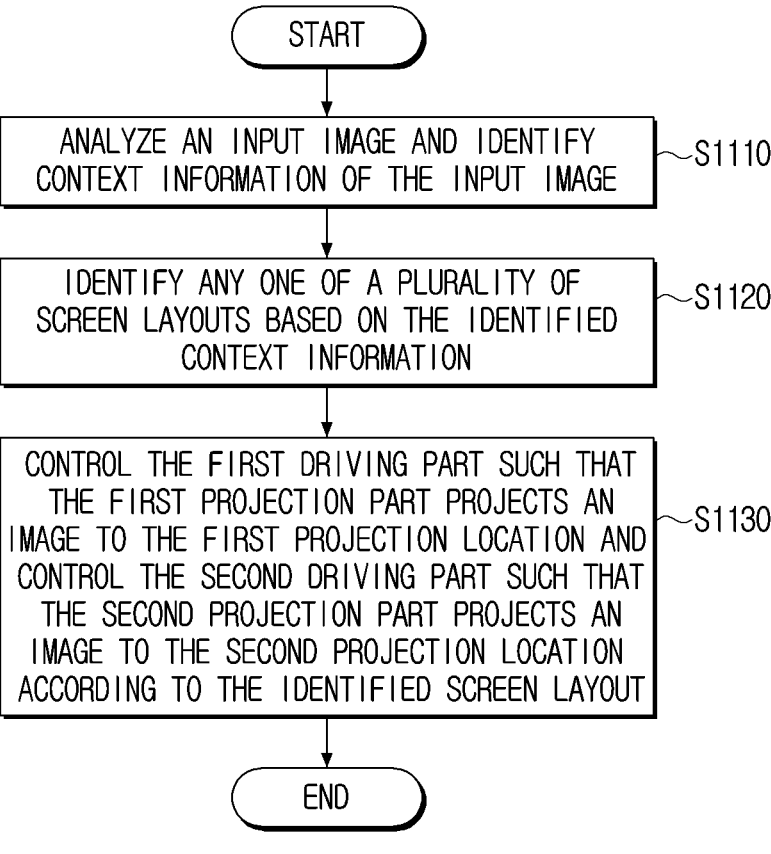

START

ANALYZE AN INPUT IMAGE AND IDENTIFY
CONTEXT INFORMATION OF THE INPUT IMAGE    ~S1110

IDENTIFY ANY ONE OF A PLURALITY OF
SCREEN LAYOUTS BASED ON THE IDENTIFIED
CONTEXT INFORMATION    ~S1120

CONTROL THE FIRST DRIVING PART SUCH THAT
THE FIRST PROJECTION PART PROJECTS AN
IMAGE TO THE FIRST PROJECTION LOCATION AND
CONTROL THE SECOND DRIVING PART SUCH THAT
THE SECOND PROJECTION PART PROJECTS AN
IMAGE TO THE SECOND PROJECTION LOCATION
ACCORDING TO THE IDENTIFIED SCREEN LAYOUT    ~S1130

END

IMAGE OUTPUT APPARATUS INCLUDING A PLURALITY OF PROJECTION PARTS AND CONTROL METHOD THEREOF

CROSS-REFERENCE TO RELATED APPLICATIONS

This application is a continuation application of International Application No. PCT/KR2023/006145, filed on May 4, 2023, which claims priority to Korean Patent Application No. 10-2022-0092587, filed on Jul. 26, 2022, in the Korean Intellectual Property Office, the disclosures of which are incorporated by reference herein in their entireties.

BACKGROUND

1. Field

The disclosure relates to an image output apparatus and a control method thereof, and more particularly, to an image output apparatus outputting an image by using a plurality of movable projection parts, and a control method thereof.

2. Description of Related Art

Recently, display apparatuses of various forms may have been developed and distributed.

In various image display environments, there may be an increase of cases in which, rather than using one display apparatus, a plurality of display apparatuses may be used, such as, but not limited to, a plurality of projector apparatuses, and the like.

Cases in which a plurality of projector apparatuses may be used may provide various effects and/or advantages such as, but not limited to, an increase of the size of an image, an increase of the maximum output luminance of an image, and the like. However, directly adjusting projection locations of the plurality of projector apparatuses may prove difficult to a user. Alternatively or additionally, the user may find it difficult to directly determine appropriate projection locations according to each characteristic and context of an image.

Accordingly, in a dual projection environment using a plurality of projectors, there exists a need for an image output apparatus that may automatically adjust a projection location in consideration of the characteristics of an image, and a control method thereof.

SUMMARY

According to an aspect of the present disclosure, an image output apparatus includes a communication interface comprising a circuit; a first projector; a second projector; a first driver configured to adjust a first projection location of the first projector; a second driver configured to adjust a second projection location of the second projector; and at least one processor configured to: identify context information of an input image received through the communication interface; identify a screen layout from a plurality of screen layouts, based on the context information; control, according to the screen layout, the first driver such that the first projector projects a first image to the first projection location; and control, according to the screen layout, the second driver such that the second projector projects a second image to the second projection location.

According to an aspect of the present disclosure, a control method of an image output apparatus includes identifying context information of an input image; selecting a screen layout from a plurality of screen layouts, based on the context information; controlling, according to the screen layout, a first driver of the image output apparatus such that a first projector of the image output apparatus projects a first image to a first projection location; and controlling, according to the screen layout, a second driver of the image output apparatus such that a second projector of the image output apparatus projects a second image to a second projection location.

According to an aspect of the disclosure, a computer-readable recording medium including a program executing a control method of an image output apparatus, the control method including identifying context information of an input image; selecting a screen layout from a plurality of screen layouts, based on the context information; controlling, according to the screen layout, a first driver of the image output apparatus such that a first projector of the image output apparatus projects a first image to a first projection location; and controlling, according to the screen layout, a second driver of the image output apparatus such that a second projector of the image output apparatus projects a second image to a second projection location.

Additional aspects are set forth in part in the description which follows and, in part, may be apparent from the description, or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 11 is a flow chart illustrating a control method of an image output apparatus, according to an embodiment of the disclosure.

DETAILED DESCRIPTION

Figure 1:
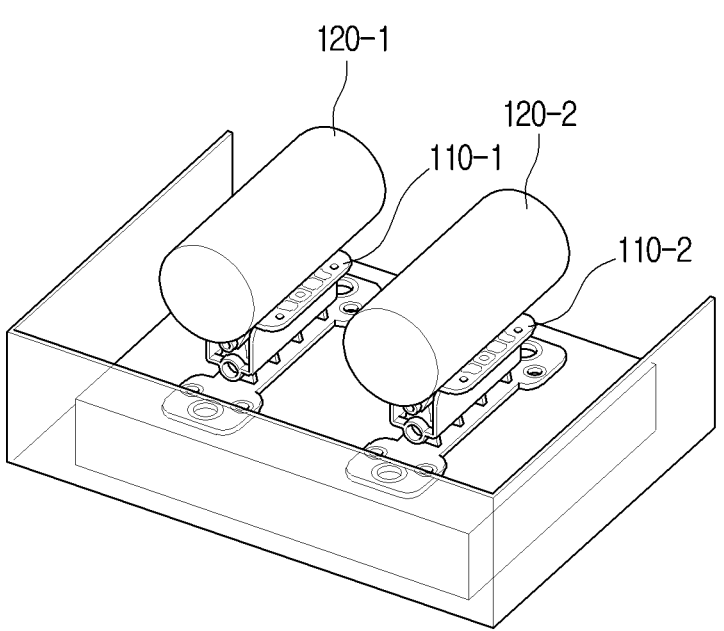
FIG. 1 is a diagram illustrating a configuration of an image output apparatus, according to an embodiment of the disclosure.

First, terms used in this specification are described briefly, and then the disclosure is described in detail.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms are described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments may be illustrated in drawings, and the embodiments may be described in the detailed description. However, it should be noted that the various embodiments may not be for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation may be omitted.

In addition, terms such as "first," "second," etc. may be used to describe various elements, but the terms are not intended to limit the elements. Such terms are used only to distinguish one element from another element. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

Further, singular expressions include plural expressions, unless defined differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

It is to be understood that the specific order or hierarchy of blocks in the processes/flow charts disclosed are an illustration of exemplary approaches. Based upon design preferences, it is understood that the specific order or hierarchy of blocks in the processes/flow charts may be rearranged. Further, some blocks may be combined or omitted. The accompanying claims present elements of the various blocks in a sample order, and are not meant to be limited to the specific order or hierarchy presented.

Hereinafter, the embodiments of the disclosure are described with reference to the accompanying drawings, such that those having ordinary skill in the art to which the disclosure belongs may carry out the disclosure. However, it should be noted that the disclosure may be implemented in various different forms, and may not be limited to the embodiments described herein. In addition, in the drawings, parts that may not be needed for explaining the disclosure clearly may have been omitted. Further, throughout the specification, similar components have been designated by similar reference numerals.

FIG. 1 is a diagram illustrating a configuration of an image output apparatus, according to an embodiment.

Referring to FIG. 1, the image output apparatus 100 may include at least one of apparatuses in various types that output images. For example, the image output apparatus 100 may be implemented as a projector apparatus that enlarges and/or projects an image on a wall and/or a screen. That is, the projector apparatus may include, but not be limited to, a liquid-crystal display (LCD) projector, a digital light processing (DLP) type processor using a digital micromirror device (DMD), and the like.

As shown in FIG. 1, the image output apparatus 100 may include a plurality of projection parts or projectors (e.g., first projection part or projector 120-1, second projection part or projector 120-2) configured to project images. In an embodiment, the features and/or specifications of each of the first projection part 120-1 and the second projection part 120-2 may be substantially similar and/or may be the same. For example, brightness units (e.g., American National Standards Institute (ANSI) lumens units, light-emitting diode (LED) lumens units, and the like), contrast ratios, resolutions, and the like, of each of the first projection part 120-1 and the second projection part 120-2 may be substantially similar and/or may be the same. Alternatively or additionally, the features and/or specifications of each of the first projection part 120-1 and the second projection part 120-2 may be different.

According to an embodiment, each of the plurality of projection parts or projectors 120-1, 120-2 may be implemented as a projector apparatus (e.g., a projector display) configured to project images. However, the present disclosure is not limited thereto. For example, the plurality of projection parts 120-1, 120-2 may be implemented as at least one of display apparatuses in various forms such as, but not limited to, a television (TV), a video wall, a large format display (LFD), a digital signage, a digital information display (DID), and the like.

Alternatively or additionally, the display apparatuses may include displays in various forms such as, but not limited to, an LCD, organic light-emitting diodes (OLED), liquid crystal on silicon (LCoS), DLP, a quantum dot (QD) display panel, quantum dot light-emitting diodes (QLED), micro LED (μLED), mini LED, and the like.

In some embodiments, a dual projection system may be implemented by using an image output apparatus 100 including a plurality of projection parts 120-1, 120-2. However, the present disclosure may not be limited thereto.

In optional or additional embodiments, a dual projection system may be implemented by using the image output apparatus 100 and another image output apparatus 100' performing communication with each other. In such embodiments, each of the image output apparatus 100 and the another image output apparatus 100' may include at least one projection part 120.

Alternatively or additionally, the image output apparatus 100 may include a display apparatus for a household use and/or an industrial use. In some embodiments, the image output apparatus 100 may include a lighting apparatus and/or an acoustic apparatus including an acoustic module, which may be used to perform common everyday duties. For another example, the image output apparatus 100 may be implemented as a portable communication apparatus (e.g., a smartphone), a computer apparatus, a portable multimedia apparatus, a wearable apparatus, a home appliance, and the like.

The image output apparatus 100 may not be limited to the aforementioned apparatuses. That is, the image output apparatus 100 may be implemented as an image output apparatus 100 equipped with two or more functions of the aforementioned apparatuses. For example, in an example image output apparatus 100, a projector function may be turned off and a lighting function and/or a speaker function may be turned on according to a manipulation of the processor, such that the image output apparatus 100 may be utilized as a display apparatus, a lighting apparatus, and/or an acoustic apparatus. Alternatively or additionally, the image output apparatus 100 may include a microphone and/or a communication apparatus, such that the image output apparatus 100 may be utilized as an artificial intelligence (AI) speaker.

According to an embodiment, the first projection part 120-1 and the second projection part 120-2 may be combined, and may provide one image. For example, an image output by the first projection part 120-1 (e.g., a first image) and an image output by the second projection part 120-2 (e.g., a second image) of the image output apparatus 100 may be arranged to constitute one image. For example, any one of the first image and/or the second image may be located on a left side and the other one may be located on a right side. Alternatively or additionally, any one of the first image and/or the second image may be located on an upper side (e.g., top) and the other one may be located on a lower side (e.g., bottom). Hereinafter, such an image arrangement may be referred to as an array screen layout.

In the array screen layout described above, one image may be constituted from the arrangement of the images output by each of the first projection part 120-1 and the second projection part 120-2. Consequently, the size of the resulting image and/or the resolution of the resulting image may be increased.

Alternatively or additionally, one image may be constituted as the first image output by the first projection part 120-1 and the second image output by the second projection part 120-2 are overlayed over each other. Hereinafter, such an image arrangement may be referred to as an overlay screen layout.

That is, in the overlay screen layout described above, one image may be constituted by overlaying the first and second images outputted by the first projection part 120-1 and the second projection part 120-2. Consequently, the brightness (e.g., the luminance) of resulting the image may be increased.

In an embodiment, the image output apparatus 100 may identify context information of an image. Alternatively or additionally, the image output apparatus 100 may identify (and/or select) a screen layout from a plurality of screen layouts, based on the identified context information.

For example, the image output apparatus 100 may identify context information of an image, and identify an array screen layout based on the identified context information. In such an example, the image output apparatus 100 may adjust the projection location of the first projection part 120-1 and the projection location of the second projection part 120-2 according to the array screen layout.

For another example, the image output apparatus 100 may identify context information of an image, and identify an overlay screen layout based on the identified context information. In such an example, the image output apparatus 100 may adjust the projection location of the first projection part 120-1 and the projection location of the second projection part 120-2 according to the overlay screen layout.

In an embodiment, the image output apparatus 100 may adjust the projection location of the first projection part 120-1 by controlling a first driving part or first driver 110-1. Alternatively or additionally, the image output apparatus 100 may adjust the projection location of the second projection part 120-2 by controlling a second driving part or second driver 110-2.

Figure 2:
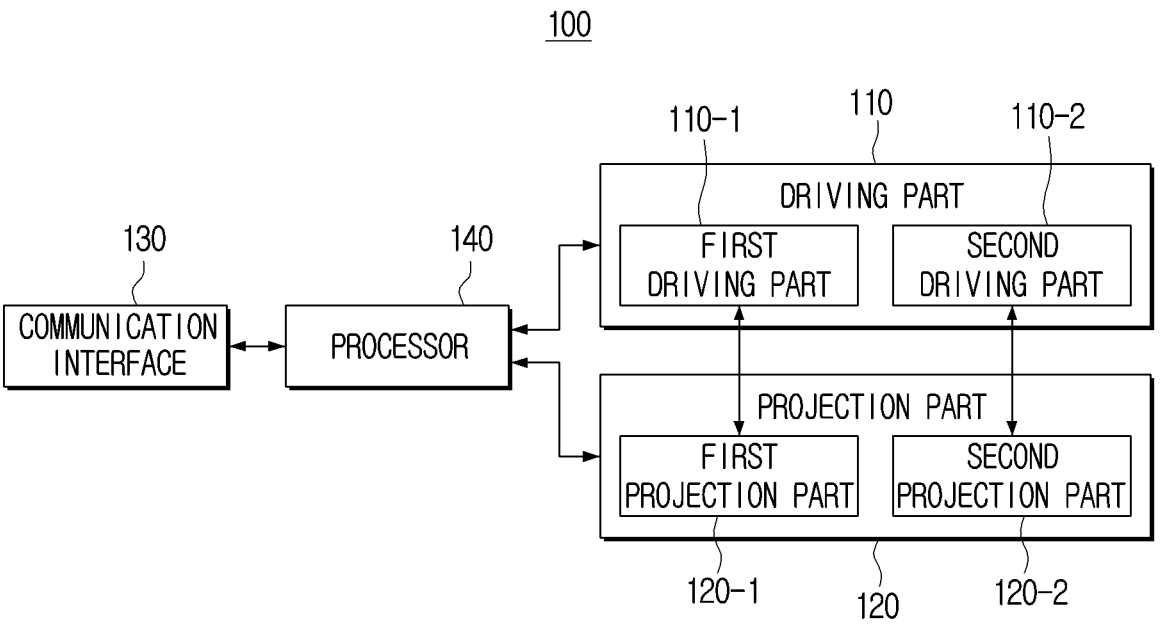
FIG. 2 is a block diagram illustrating a configuration of an image output apparatus, according to an embodiment of the disclosure.

FIG. 2 is a block diagram illustrating a configuration of an image output apparatus, according to an embodiment.

Referring to FIG. 2, the image output apparatus 100 may include a driving part or driver 10, a projection part 120, a communication interface 130, and at least one processor 140.

The driving part 110 according to an embodiment may include a first driving part 110-1 and a second driving part 110-2. In an embodiment, each of the first driving part 110-1 and the second driving part 110-2 may include at least one motor.

For example, each of the first driving part 110-1 and the second driving part 110-2 may include a pan, tilt, zoom (PTZ) motor. The PTZ motor may refer to a motor that may rotate in a pan direction (e.g., a horizontal direction, left and right directions), and a motor that may rotate in a tilt direction (e.g., a vertical direction, up and down directions).

The processor 140, according to an embodiment, may rotate the PTZ motor of the first driving part 110-1 in at least one direction from among four directions (e.g., up, down, left, and right), and adjust the projection location of the first projection part 120-1 (hereinafter referred to as the first projection location) coupled with the first driving part 110-1.

Alternatively or additionally, the processor 140 may rotate the PTZ motor of the second driving part 110-2 in at least one direction among the four directions (e.g., up, down, left, and right), and adjust the projection location of the second projection part 120-2 (hereinafter referred to as the second projection location) coupled with the second driving part 110-2.

In an embodiment, the projection part 120 may include the first projection part 120-1 and the second projection part 120-2. Alternatively or additionally, each of the first projection part 120-1 and the second projection part 120-2 may output an image to different projection surfaces and/or the same projection surface.

In an optional or additional embodiment, each of the first projection part 120-1 and the second projection part 120-2 may include a projection lens. The projection lens may be formed on one surface of the main body of the image output apparatus 100. The projection lens may be formed to project a light that passed through the lens array to the outside of the main body. The projection lens, according to various embodiments, may include a low-dispersion coated optical lens for reducing the chromatic aberration. Alternatively or additionally, the projection lens may be a convex lens or a condensing lens. In an embodiment, the projection lens may adjust the focus by adjusting the locations of a plurality of sub lenses.

Each of the first projection part 120-1 and the second projection part 120-2 may perform a function of outputting an image on a projection surface.

The projection surface may be a part of a physical space wherein an image is output, and/or may be a separate screen.

The number and/or arrangement of components of the projection part 120 shown in FIG. 2 may not be limited to the aforementioned examples. That is, the image output apparatus 100 may output an image on a projection surface by using various methods. For example, the projection part 120 may include three or more projection parts. Hereinafter, explanation may be described by generally referring to the location of a projection surface as a projection location of the projection part 120.

The communication interface 130 may perform communication with external apparatuses in various forms (e.g., an image providing apparatus, a display apparatus, an external server, and the like). That is, the communication interface 130 may transmit and/or receive data and/or information in various forms.

For example, the communication interface 130 may receive data, information, commands, and the like, in various forms from external apparatuses that may include, but not be limited to, an image providing apparatus (e.g., a source apparatus), an external storage medium (e.g., an universal serial bus (USB) memory), an external server (e.g., a cloud server, and online file storage system), and the like, through communication methods/communication protocols such as, but not limited to, wireless networking based on access point (AP) (e.g., Wireless-Fidelity (Wi-Fi), a wireless local area network (LAN)), Bluetooth™, Zigbee, a wired/wireless LAN, a wide area network (WAN), Ethernet, Institute of Electrical and Electronics Engineers (IEEE) 1394 (FireWire), a high-definition multimedia interface (HDMI), USB, Thunderbolt™ interfaces, a mobile high-definition link (MHL), Audio Engineering Society/European Broadcasting Union (AES/EBU) interfaces, optical interfaces, coaxial interfaces, and the like.

In an embodiment, the communication interface 130 may receive an image from an image providing apparatus.

The processor 140 may be electronically connected with a memory (not shown). The processor 140 may control the overall operations of the image output apparatus 100.

According to an embodiment, the processor 140 may be implemented as a digital signal processor (DSP) processing digital signals, a microprocessor, and/or a time controller (TCON). However, the present disclosure is not limited thereto. For example, the processor 140 may include, but not be limited to, one or more of a central processing unit (CPU), a micro controller unit (MCU), a micro processing unit (MPU), a controller, an application processor (AP), or a communication processor (CP), an advanced reduced instruction set computer (RISC) machine (ARM) processor, and an AI processor, or may be defined by the terms. Alternatively or additionally, the processor 140 may be implemented as a system on chip (SoC) having a processing algorithm stored therein and/or large scale integration (LSI), and/or in the form of a field programmable gate array (FPGA).

In an embodiment, the processor 140 may perform various functions by executing computer executable instructions stored in the memory. For example, the processor 140 may analyze an input image received through the communication interface 130, and identify context information of the input image.

Alternatively or additionally, the processor 140 may identify any one of a plurality of screen layouts based on the identified context information.

In an optional or additional embodiment, the processor 140 may control the first driving part 110-1 such that the first projection part 120-1 may project an image to a first projection location, and control the second driving part 110-2 such that the second projection part 120-2 may project an image to a second projection location according to the identified screen layout.

Figure 3:
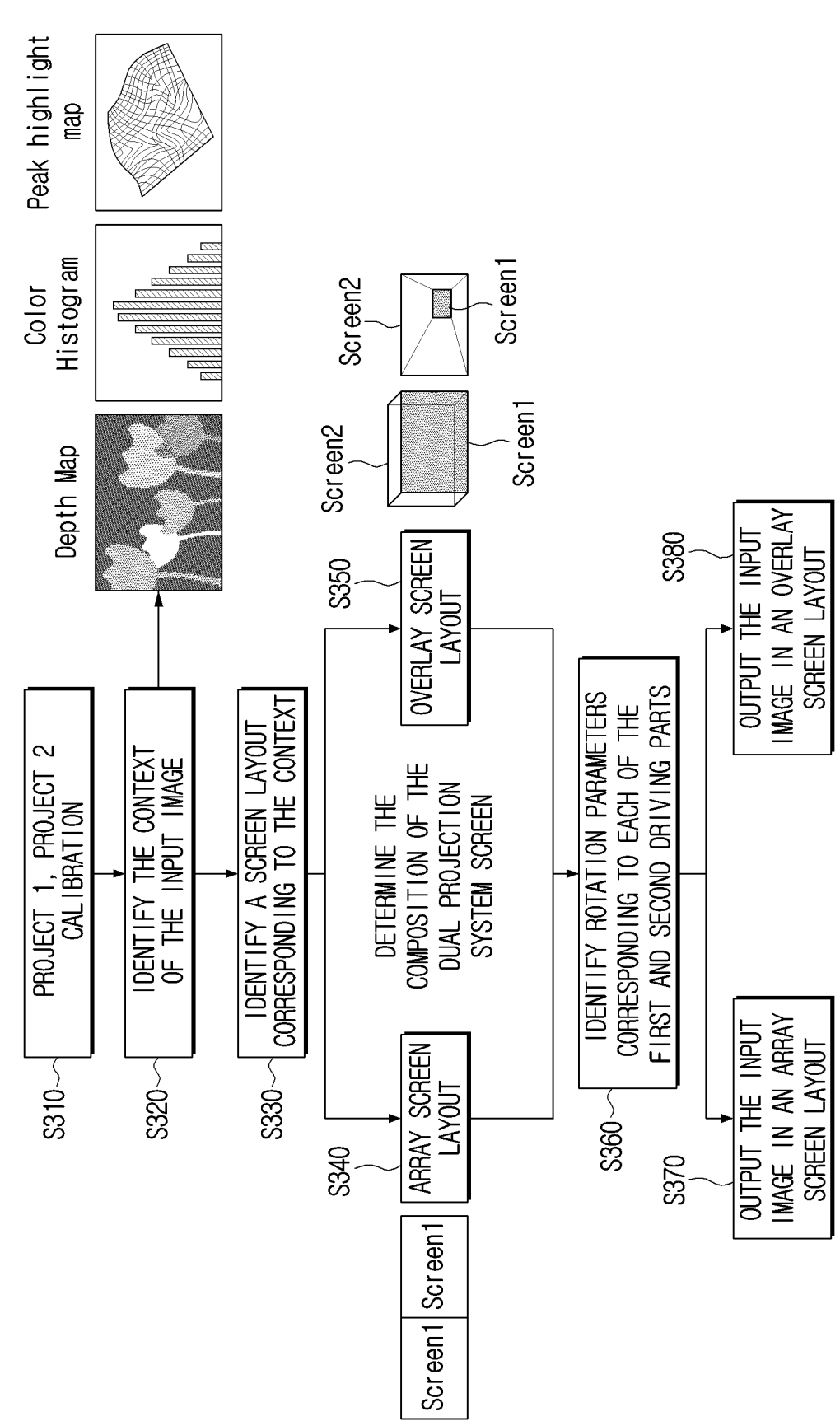
FIG. 3 is a flow chart illustrating a control method of an image output apparatus identifying screen layouts and rotation parameters, according to an embodiment of the disclosure.

FIG. 3 is a flow chart illustrating a control method of an image output apparatus identifying screen layouts and rotation parameters, according to an embodiment.

According to an embodiment, the processor 140 may perform calibration of the first projection part 120-1 (e.g., Project 1) and/or the second projection part 120-2 (e.g., Project 2) in operation S310.

For example, the processor 140 may control the first projection part 120-1 to output a first pattern image to the first projection location. Alternatively or additionally, the processor 140 may control the second projection part 120-2 to output a second pattern image to the second projection location.

In an embodiment, the image output apparatus 100 may include a sensor that may be arranged toward the front surface of the image output apparatus 100. The sensor may detect the first pattern image output by the first projection part 120-1 and/or the second pattern image output by the second projection part 120-2. For example, the sensor may include at least one camera.

The processor 140, according to an embodiment, may perform calibration of the first projection part 120-1 (e.g., Project 1) and/or the second projection part 120-2 (e.g., Project 2) based on the first pattern image and/or the second pattern image detected by the sensor, respectively.

Alternatively or additionally, the processor 140 may perform processing operations on the first pattern image and/or the second pattern image, such as, but not limited to, lens shift, color matching, edge blending, keystone correction, leveling correction (e.g., horizontal correction), focus correction, and the like.

For example, the processor 140 may perform color matching such that the color, luminance, and the like, of the first pattern image and the second pattern image may be substantially similar and/or may be the same.

For another example, the processor 140 may perform edge blending such that the boundary line in a portion, in which the first pattern image and the second pattern image overlap, does not stand out, and the first pattern image and the second patter image are connected naturally (e.g., seamless).

For another example, if the first pattern image and the second patter image are trapezoid forms due to the tilting of the image output apparatus 100, the processor 140 may perform keystone correction such that the first pattern image and the second patter image may become rectangle and/or square forms.

For another example, the processor 140 may perform leveling correction by rotating the first pattern image and/or the second pattern image as much as a specific angle such that each of the first pattern image and/or the second pattern image may become horizontal.

For another example, the processor 140 may perform focus correction such that each of the first pattern image and the second pattern image may be in focus.

The first pattern image and the second pattern image may refer to predetermined images output by the first projection part 120-1 and the second projection part 120-2, respectively, according to control by the processor 140 in an operational stage of the image output apparatus 100 (e.g., a driving stage, a booting stage, a setting stage, a calibration performing stage, and the like).

It may be apparent that the first pattern image and the second pattern image may be images including different patterns from each other, images including different objects from each other, images of different colors from each other, and/or images with different brightness levels from each other.

In operation S320, the processor 140 may analyze an input image, and identify context information of the input image.

The context information of the input image may include at least one of the size information, the resolution information, the ratio information, the luminance information, the depth map information, the object map information, the Red/Blue/Green (RGB) histogram, the color histogram, the saliency map information (e.g., a saliency mask), and the peak highlight map information of the input image.

For example, the depth map may refer to an image channel including information related to the distance of each area and/or each pixel from the observation viewpoint inside the input image.

The object map may refer to an image channel indicating the forms and/or the shapes of a plurality of objects, a predefined object, a main object having a priority greater than or equal to a threshold value, and the like, inside the input image.

The saliency map information may refer to an image channel indicating an area wherein the pixel value significantly changes inside the input image. Alternatively or additionally, the saliency map information may refer to an image channel that may distinguish at least one object inside the input image by separating the distinguished object from the background.

The peak highlight map information may refer to an image channel that may include high contrast information and/or may increase a gap between the brightest area and the darkest area inside the input image. Alternatively or additionally, the peak highlight map may indicate at least one object inside the input image by separating the indicated object from the background.

As shown in FIG. 3, the processor 140 may identify any one of the plurality of screen layouts based on the context information in operations S330, S340, and S350.

According to an embodiment, the processor 140 may identify the rotation parameter of the first driving part 110-1 for adjusting the first projection location to which the first projection part 120-1 may project an image, and/or the processor 140 may identify the rotation parameter of the second driving part 110-2 for adjusting the second projection location to which the second projection part 120-2 may project an image, according to the identified screen layout in operation S360.

The processor 140 may adjust the first projection location of the first driving part 110-1 based on the rotation parameter of the first driving part 110-1 in operation S370. The processor 140 may adjust the second projection location based on the rotation parameter of the second driving part 110-2 in operation S380.

The rotation parameters, according to an embodiment, are described with reference to FIG. 4.

Figure 4:
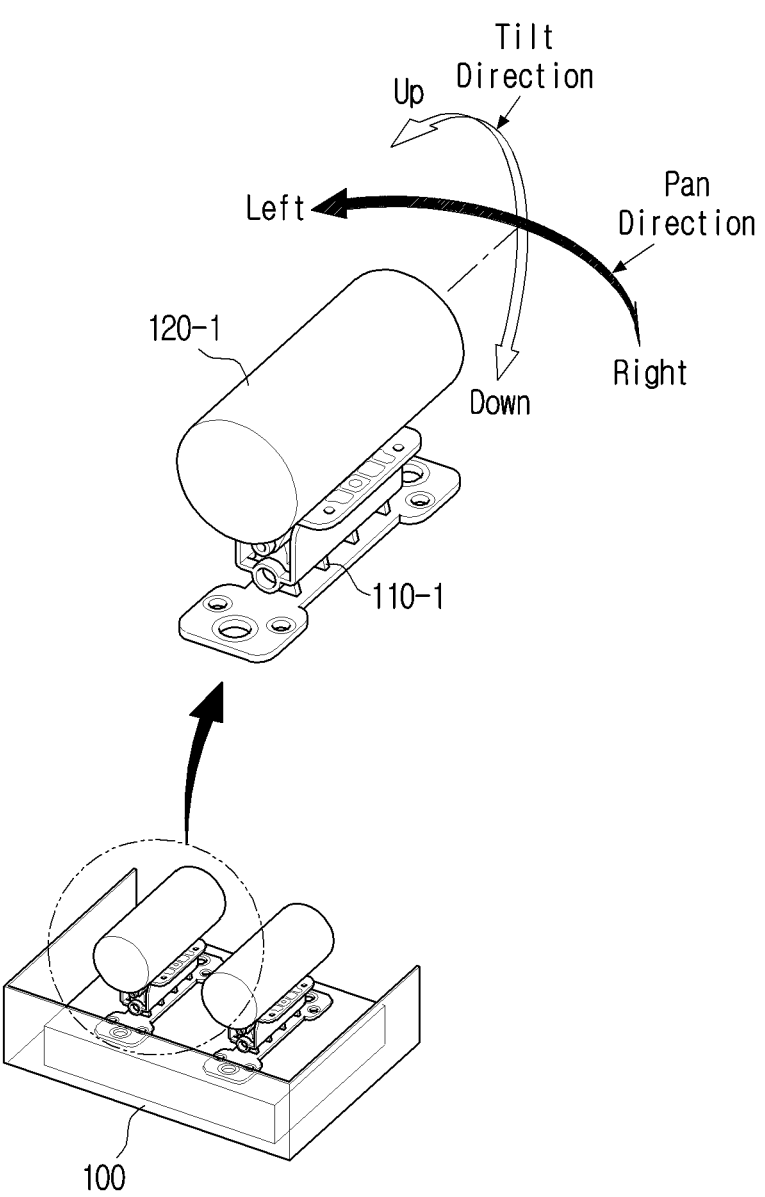
FIG. 4 is a diagram illustrating an operation of a driving part, according to an embodiment of the disclosure.

FIG. 4 is a diagram illustrating an operation of a driving part, according to an embodiment.

Referring to FIG. 4, the image output apparatus 100 may include the first projection part 120-1 and the first driving part 110-1. The first driving part 110-1 may be coupled with the first projection part 120-1 and may adjust the first projection location of the first projection part 120-1. In an embodiment, the first driving part 110-1 may include a PTZ motor. The PTZ motor, according to an embodiment, may include a motor that may rotate in a pan direction (e.g., a horizontal direction, left and right directions), and a motor that may rotate in a tilt direction (e.g., a vertical direction, up and down directions).

Alternatively or additionally, the image output apparatus 100 may include the second projection part 120-2 and the second driving part 110-2. The second driving part 110-2 may be coupled with the second projection part 120-2 and may adjust the second projection location of the second projection part 120-2. In an embodiment, the second driving part 110-2 may include a PTZ motor.

According to an embodiment, the processor 140 may identify the rotation parameter of the first driving part 110-1 for adjusting the first projection location, and the rotation parameter of the second driving part 110-2 for adjusting the second projection location, according to the identified screen layout.

For example, the rotation parameters may include rotation parameters related to a pan direction (e.g., a horizontal direction) and/or rotation parameters related to a tilt direction (e.g., a vertical direction). The rotation parameters of the pan direction may include a rotation direction in the pan direction (e.g., the left side, the right side, and/or halt) and a rotation angle (e.g., −180° to +180° based on the front surface of the image output apparatus 100). The rotation parameters of the tilt direction may include a rotation direction in the tilt direction (e.g., the upper (top) side, the lower (bottom) side, or halt) and a rotation angle (e.g., −180° to +180° based on the front surface of the image output apparatus 100).

In an embodiment, the processor 140 may rotate the PTZ motor of the first driving part 110-1 in at least one direction from among four directions (e.g., up, down, left, and right) based on the rotation parameter of the first driving part 110-1 and thereby, adjust the first projection location of the first projection part. Alternatively or additionally, the processor 140 may rotate the PTZ motor of the second driving part 110-2 in at least one direction from among the four directions (e.g., up, down, left, and right) based on the rotation parameter of the second driving part 110-2 and, thereby, adjust the second projection location of the second projection part.

Figure 5:
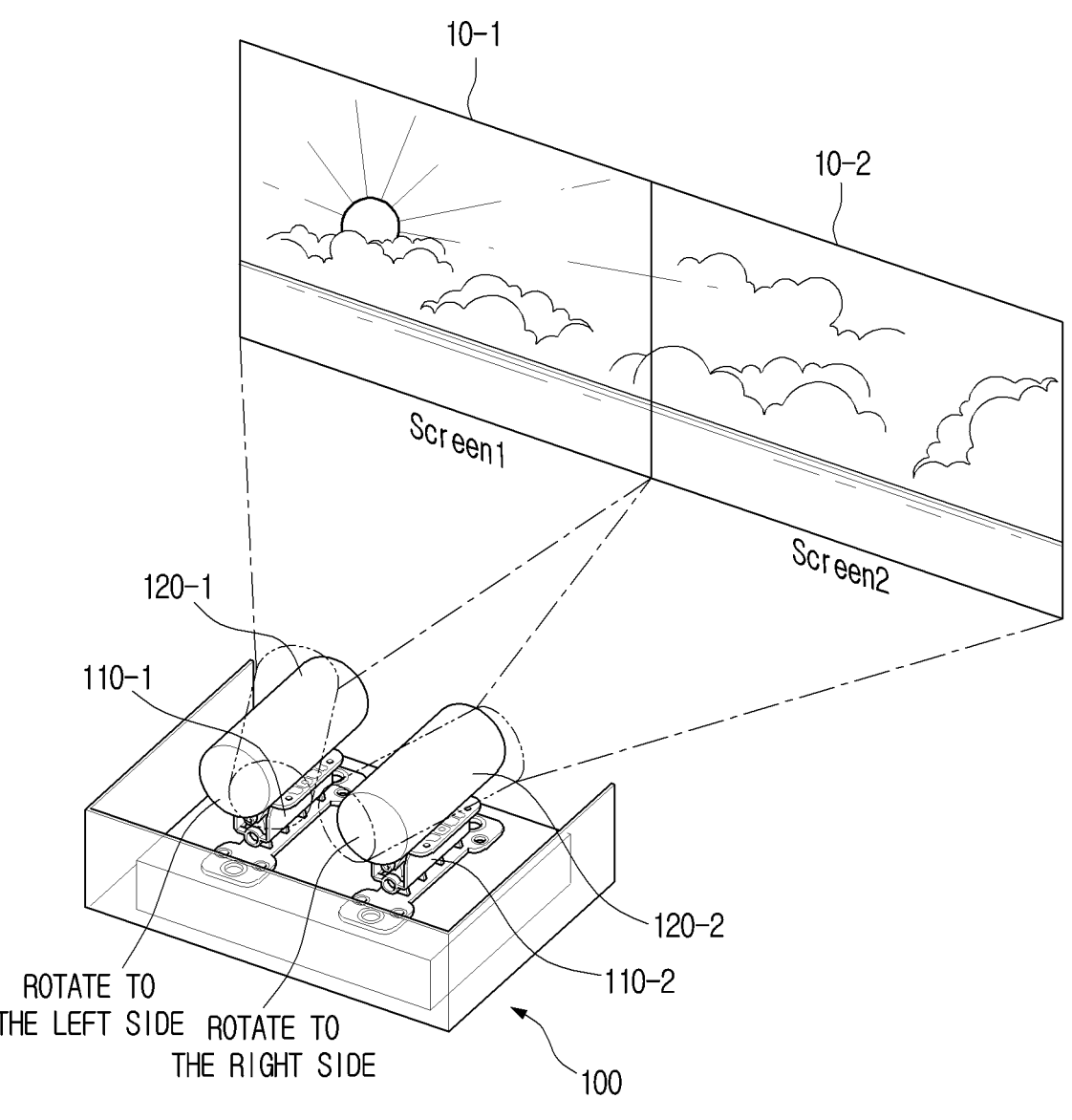
FIG. 5 is a diagram illustrating an array screen layout, according to an embodiment of the disclosure.
Figure 6:
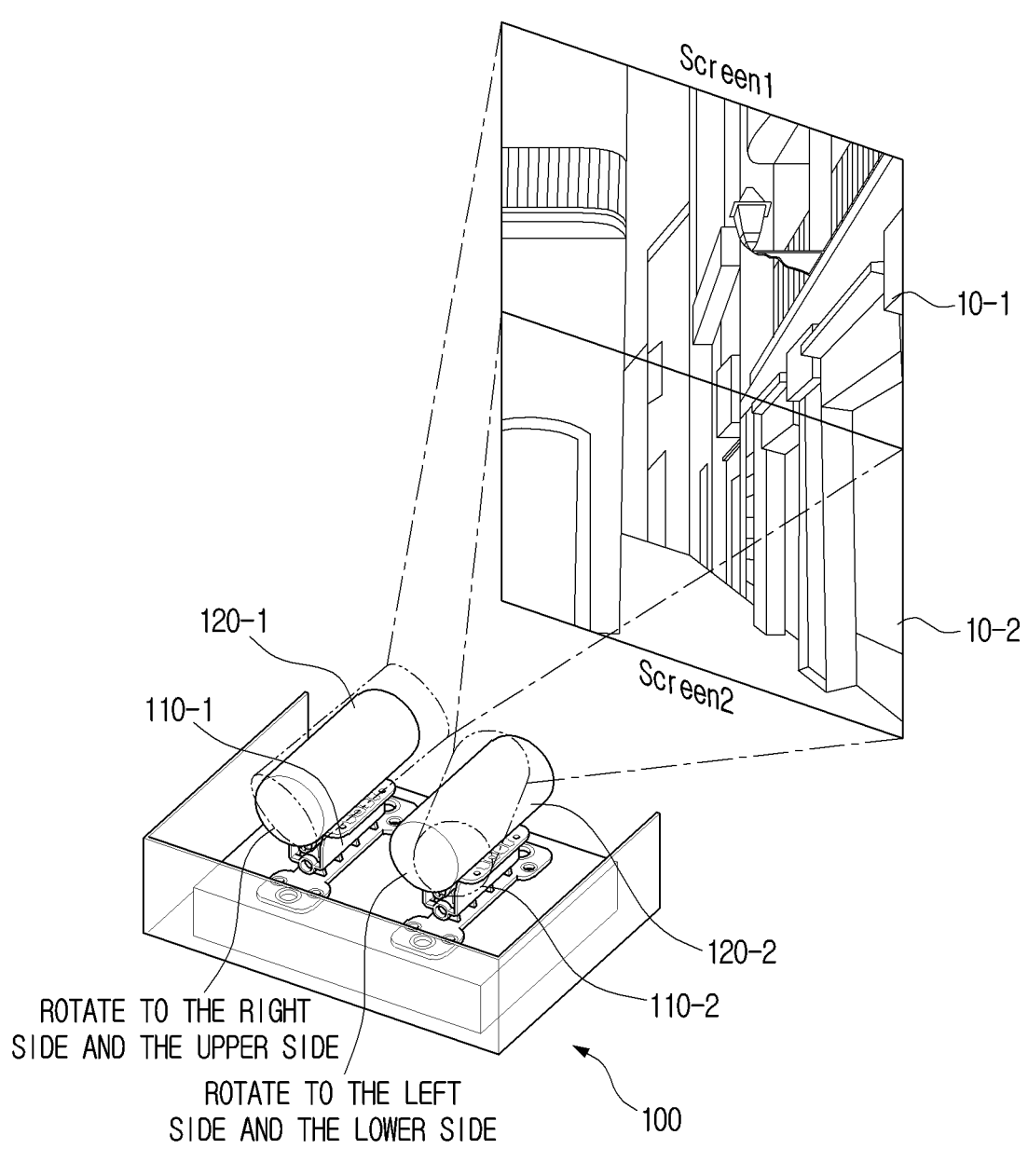
FIG. 6 is a diagram illustrating an array screen layout, according to an embodiment of the disclosure.

FIGS. 5 and 6 are diagrams illustrating an array screen layout, according to various embodiments. FIG. 5 may illustrate an example of a horizontally-arranged array screen layout from among array screen layouts. FIG. 6 may illustrate an example of a vertically-arranged array screen layout from among array screen layouts.

Referring to FIGS. 3 and 5, in operation S330 of FIG. 3 the processor 140 may identify an array screen layout from among the plurality of screen layouts based on context information of an input image (operation S340). For example, the processor 140 may identify an array screen layout from among the plurality of screen layouts for outputting an input image without distortion based on at least one of the size information, the ratio information, and the resolution information of the input image (operation S340).

In operation S360, the processor 140 may identify the rotation parameter of the first driving part 110-1 for the first projection part 120-1 to project a first portion (Screen1) 10-1 (e.g., the first image portion) of the input image to the first projection location, according to the array screen layout identified in operation S340. Alternatively or additionally, the processor 140 may identify the rotation parameter of the second driving part 110-2 for the second projection part 120-2 to project a second portion (Screen2) 10-2 (e.g., the second image portion) of the input image to the second projection location, according to the array screen layout identified in operation S340.

In an embodiment, the processor 140 may control the rotation of the first driving part 110-1 according to the rotation parameter of the first driving part 110-1. For example, as shown in dotted lines in FIG. 5, the processor 140 may adjust the first projection location of the first projection part 120-1 to the left side by rotating the first driving part 110-1 to the left side.

In an optional or additional embodiment, the processor 140 may control the rotation of the second driving part 110-2 according to the rotation parameter of the second driving part 110-2. For example, as shown in dotted lines in FIG. 5, the processor 140 may adjust the second projection location of the second projection part 120-2 to the right side by rotating the second driving part 110-2 to the right side.

For example, in the array screen layout, the first projection part 120-1 may output the first portion (Screen1) 10-1 (e.g., the first image portion) of the input image, and the second projection part 120-2 may output the second portion (Screen2) 10-2 (e.g., the second image portion) of the input image adjacent to the first portion (Screen1) 10-1. Thus, the image output apparatus 100 may output one image wherein the first portion 10-1 and the second portion 10-2 are combined (e.g., an output image in operation S370).

That is, the array screen layout may refer to a screen layout in which the first projection location of the first projection part 120-1 and the second projection location of the second projection part 120-2 are arranged in adjacent locations to each other.

Referring to FIGS. 3 and 6, the processor 140 may identify the rotation parameter of the first driving part 110-1 for the first projection part 120-1 to project the first portion (Screen1) 10-1 (e.g., the first image portion) of the input image to the first projection location, according to the array screen layout identified in operation S340. Alternatively or additionally, the processor 140 may identify the rotation parameter of the second driving part 110-2 for the second projection part 120-2 to project the second portion (Screen2) 10-2 (e.g., the second image portion) of the input image to the second projection location, according to the array screen layout identified in operation S340.

In an embodiment, the processor 140 may control the rotation of the first driving part 110-1 according to the rotation parameter of the first driving part 110-1. For example, as shown in dotted lines in FIG. 6, the processor 140 may adjust the first projection location of the first projection part 120-1 to the upper (top) side by rotating the first driving part 110-1 to the right side and/or the upper (top) side by a specific angle.

In an optional or additional embodiment, the processor 140 may control the rotation of the second driving part 110-2 according to the rotation parameter of the second driving part 110-2. For example, as shown in dotted lines in FIG. 6, the processor 140 may adjust the second projection location of the second projection part 120-2 to the lower (bottom) side by rotating the second driving part 110-2 to the left side and/or the lower (bottom) side by a specific angle.

That is, in the array screen layout, the first projection part 120-1 may output the first portion 10-1 (e.g., the first image portion) of the input image to the upper (top) side, and the second projection part 120-2 may output the second portion 10-2 (e.g., the second image portion) of the input image to the lower side. Thus, the image output apparatus 100 may output one image wherein the first portion 10-1 and the second portion 10-2 are combined (e.g., an output image in operation S370).

Figure 7:
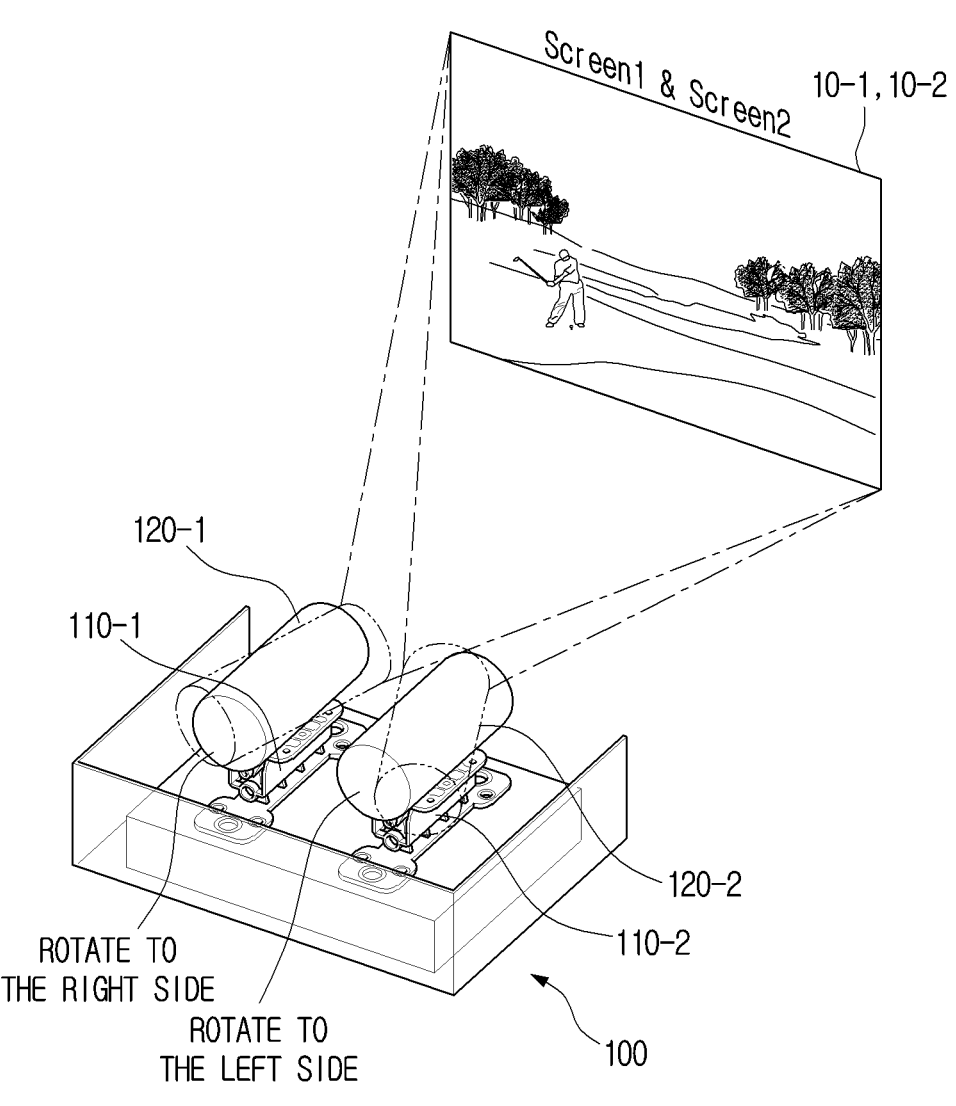
FIG. 7 is a diagram illustrating an overlay screen layout, according to an embodiment of the disclosure.

FIG. 7 is a diagram illustrating an overlay screen layout, according to an embodiment.

Referring to FIGS. 3 and 7, in operation S330 in FIG. 3, the processor 140 may identify an overlay screen layout from among the plurality of screen layouts based on context information of an input image (operation S350).

For example, the processor 140 may identify an overlay screen layout from among the plurality of screen layouts for outputting an input image without distortion based on at least one of the luminance information, the depth map information, the object map information, the RGB histogram, the color histogram, the saliency map information (e.g., the saliency mask), and the peak highlight map of the input image, for maintaining and/or increasing the contrast ratio, the depthness, and/or the dynamic range of the input image (operation S350).

In an embodiment, if the maximum luminance of the input image is greater than the maximum luminance that may be output by each of the first projection part 120-1 and the second projection part 120-2, the processor 140 may identify an overlay screen layout from among the plurality of screen layouts.

In an optional or additional embodiment, if a plurality of objects included in the input image are identified in at least one of the depth map, the object map, or the saliency map information (e.g., the saliency mask) of the input image, the processor 140 may identify an overlay screen layout for increasing the luminance of an object in a near distance (e.g., an object located in a relatively near distance from the observation viewpoint), and/or for decreasing the luminance of an object in a far distance (e.g., an object located in a relatively far distance from the observation viewpoint).

In operation S360, the processor 140 may identify the rotation parameter of the first driving part 110-1 for the first projection part 120-1 to project the first image (Screen1) 10-1 of the input image to the first projection location, according to the overlay screen layout identified in operation S350. Alternatively or additionally, the processor 140 may identify the rotation parameter of the second driving part 110-2 for the second projection part 120-2 to project the second image (Screen2) 10-2 of the input image to the second projection location, according to the overlay screen layout identified in operation S350.

In an embodiment, the processor 140 may control the rotation of the first driving part 110-1 according to the rotation parameter of the first driving part 110-1. For example, as shown in dotted lines in FIG. 7, the processor 140 may adjust the first projection location of the first projection part 120-1 to the right side by rotating the first driving part 110-1 to the right side.

In an optional or additional embodiment, the processor 140 may control the rotation of the second driving part 110-2 according to the rotation parameter of the second driving part 110-2. For example, as shown in dotted lines in FIG. 7, the processor 140 may adjust the second projection location of the second projection part 120-2 to the left side by rotating the second driving part 110-2 to the left side.

That is, in the overlay screen layout, the first projection location of the first projection part 120-1 and the second projection location of the second projection part 120-2 may be substantially similar and/or may be the same location.

For example, in the overlay screen layout, the first projection part 120-1 may output the first image (Screen1) 10-1, and the second projection part 120-2 may output the second image (Screen2) 10-2. Thus, the image output apparatus 100 may output one image wherein the first image and the second image overlap (e.g., an output image in operation S380).

In an embodiment, the first image (Screen1) 10-1 output by the first projection part 120-1 and the second image (Screen2) 10-2 output by the second projection part 120-2 may be substantially similar and/or may be the same image. Alternatively or additionally, the first image (Screen1) 10-1 and the second image (Screen2) 10-2 may be different images.

In an embodiment, when an overlay screen layout is identified, the processor 140 may apply, to the input image, a first tone map curve configured to extend the dynamic range (DR) of the input image to obtain the first image (Screen1) 10-1. For example, applying the first tone map curve may result in the luminance of a relatively bright area (e.g., a high gray scale, high luminance) to be increased from among a plurality of areas included in the input image. Alternatively or additionally, applying the first tone map curve may result in the luminance of a relatively dark area (e.g., a low gray scale, low luminance) to be decreased from among the plurality of areas included in the input image. In an optional or additional embodiment, the processor 140 may apply a second tone map curve to the input image to obtain the second image (Screen2) 10-2. In some embodiments, the first tone map curve and the second tone map curve may be substantially similar and/or may be the same map curve. Alternatively or additionally, the first tone map curve and the second tone map curve may be different.

In an embodiment, the processor 140 may control the first projection part 120-1 to output the first image (Screen1) 10-1, and may control the second projection part 120-2 to output the second image (Screen2) 10-2. The image output apparatus 100 may output one image wherein the first image (Screen1) 10-1 and the second image (Screen2) 10-2 overlap (e.g., an image of which DR was extended in operation S380).

Figure 8:
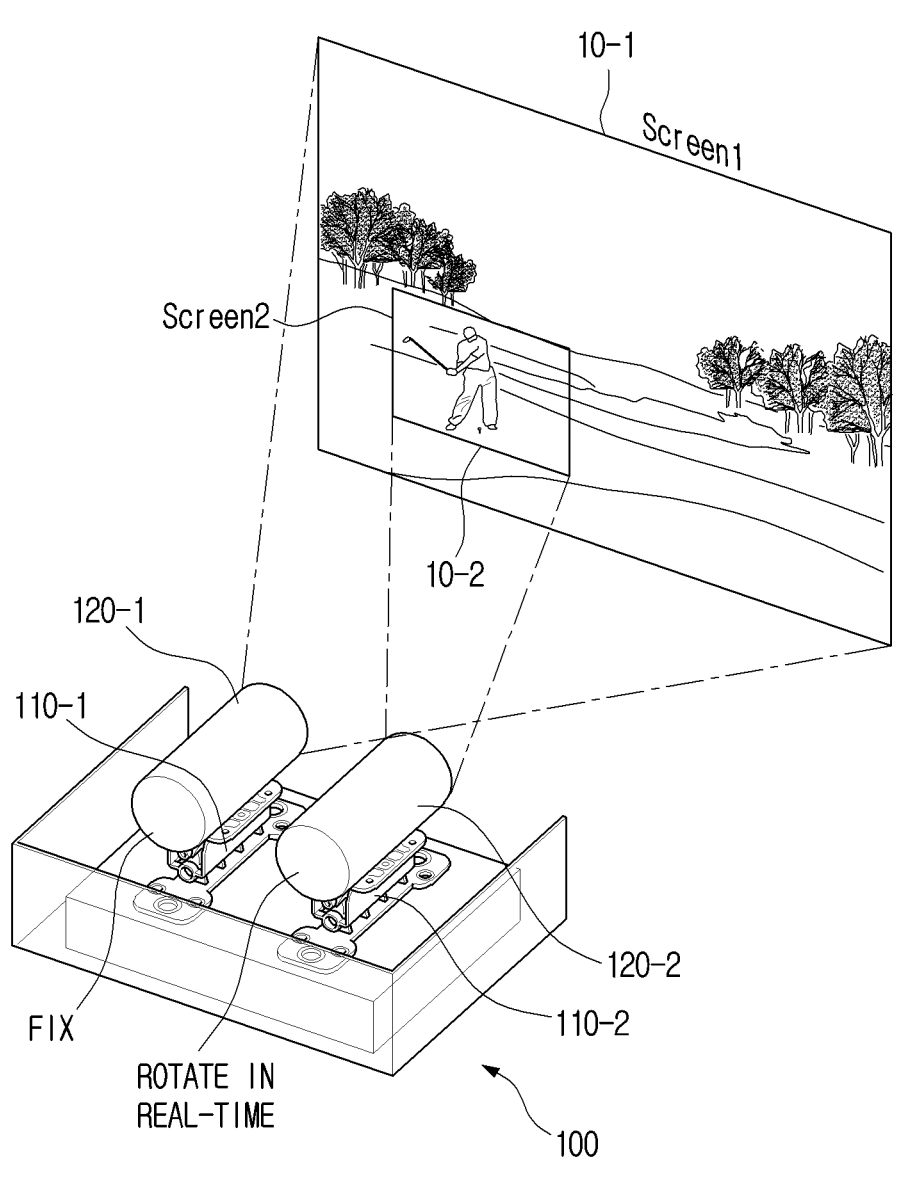
FIG. 8 is a diagram illustrating a partial overlay screen layout, according to an embodiment of the disclosure.

FIG. 8 is a diagram illustrating a partial overlay screen layout, according to an embodiment.

Referring to FIGS. 3 and 8, in operation S330 in FIG. 3, the processor 140 may identify a partial overlay screen layout from among the plurality of screen layouts based on context information of an input image (operation S350).

For example, the processor 140 may identify a partial overlay screen layout from among the plurality of screen layouts for emphasizing a specific object (and/or for increasing visibility for a specific object) from among a plurality of objects included in the input image based on at least one of the depth map information, the object map information, the RGB histogram, the color histogram, the saliency map information (e.g., the saliency mask), or the peak highlight map (operation S350).

In an embodiment, if a character object controlled according to a user manipulation and/or a main object that may interact according to a user manipulation is identified from among a plurality of objects included in the input image based on the depth map information and the object map information, the processor 140 may identify an overlay screen layout from among the plurality of screen layouts. Alternatively or additionally, if the input image is a game content, the processor 140 may identify an overlay screen layout from among the plurality of screen layouts.

The object that may interact according to a user manipulation may be referred to as a main object, and an object that may not interact among the plurality of objects included in the input image (e.g., the background included in the input image, and the like) may be referred to as sub-objects.

In an optional or additional embodiment, if the plurality of objects included in the input image is identified in at least one of the depth map, the object map, or the saliency map information (e.g., the saliency mask) of the input image, the processor 140 may identify a partial overlay screen layout for further emphasizing an object in a near distance (e.g., an object located in a relatively near distance from the observation viewpoint) over the remaining objects (e.g., objects located in a relatively far distance from the observation viewpoint).

In operation S360, according to the identified partial overlay screen layout, the processor 140 may identify the rotation parameter of the first driving part 110-1 for the first projection part 120-1 to project the first portion (Screen1) 10-1 (e.g., the first image portion) of the input image to the first projection location. Alternatively or additionally, the processor 140 may identify the rotation parameter of the second driving part 110-2 for the second projection part 120-2 to project the second portion (Screen2) 10-2 (e.g., the second image portion) of the input image to the second projection location, according to the identified partial overlay screen layout.

In an embodiment, when a partial overlay screen layout is identified among the plurality of screen layouts based on the context information of the input image, the processor 140 may identify the first portion 10-1 (e.g., the first area, the first image portion) including a specific object among the plurality of objects included in the input image. Alternatively or additionally, the processor 140 may identify the second portion 10-2 (e.g., the second area, the second image portion) including the remaining objects according to the partial overlay screen layout.

For example, the first portion 10-1 may include a specific object (e.g., a character object, a main object, and the like), and the second portion 10-2 may include the remaining objects (e.g., the background, the sub-objects, and the like) of the plurality of objects included in the input image.

The processor 140, according to an embodiment, may control the rotation of the first driving part 110-1 such that the first projection part 120-1 projects the first portion 10-1 to the first projection location, and may control the rotation of the second driving part 110-2 such that the second projection part 120-2 projects the second portion 10-2 to the second projection location.

For example, if the first portion 10-1 is a character object, and the second portion 10-2 is the background, the processor 140 may rotate the first driving part 110-1 according to the rotation parameter of the first driving part 110-1, and may not rotate the second driving part 110-2.

That is, as shown in FIG. 8, the processor 140 may control the second driving part 110-2 (e.g., fix the second driving part 110-2) such that the projection location of the second portion 10-2 is maintained to project the background, and control the first driving part 110-1 (e.g., rotate the first driving part 110-1 in real time) such that the projection location of the first portion 10-1 is moved within the second projection location according to the motion of the character object inside the input image.

Although FIG. 8 shows a case in which the first projection part 120-1 projects the first portion 10-1 including a specific object, and the second projection part 120-2 projects the second portion 10-2 including the remaining objects, the present disclosure may not be limited thereto. For example, as shown in FIG. 8, it may be apparent that the first projection part 120-1 may project the first portion 10-1 including the remaining objects (e.g., the background), and the second projection part 120-2 may project the second portion 10-2 including a specific object (e.g., the character object) according to control by the processor 140.

Alternatively or additionally, the processor 140 may control the first projection part 120-1 and the second projection part 120-2 to project each of the first portion 10-1 and the second portion 10-2 by using an edge blending function.

For example, as shown in FIGS. 5 and 6, in an array screen layout, the processor 140 may perform edge blending such that the first portion 10-1 and the second portion 10-2 may be connected naturally and become one image (e.g., seamless). That is, the performing of the edge blending function may be performed such that a blank or empty area may not be generated between the first portion 10-1 and the second portion 10-2, and/or that an overlapping area may not be generated between the first portion 10-1 and the second portion 10-2.

In some embodiments, the processor 140 may adjust the brightness, the projection location, and the like, of each of the first portion 10-1 and the second portion 10-2, and provide one image according to the seamless connection of the first portion 10-1 and the second portion 10-2.

For example, in one area wherein the first portion 10-1 and the second portion 10-2 contact each other, the brightness of each of the first portion 10-1 and the second portion 10-2 may overlap. Consequently, a problem in that the boundary line may be distinguished (e.g., brighter than other areas of the first portion 10-1 and second portion 10-2) may occur. Accordingly, the processor 140, in an embodiment, may adjust the brightness (e.g., decrease the brightness) of the area wherein the first portion 10-1 and the second portion 10-2 contact each other. As a result, the processor 140 may provide one image such that the brightness of the boundary line is substantially similar and/or may be the same as (e.g., a brightness difference may be within a threshold value) the brightness of the remaining areas (e.g., the remaining areas excluding the area wherein the first portion 10-1 and the second portion 10-2 contact each other) even if the brightness of each of the first portion 10-1 and the second portion 10-2 overlaps.

For another example, as shown in FIG. 7 or 8, in an overlay screen layout, the first projection part 120-1 may output the first image (Screen1) 10-1, and the second projection part 120-2 may output the second image (Screen2) 10-2. Consequently, the processor 140 may perform edge blending such that the first image (Screen1) 10-1 and the second image (Screen2) 10-2 overlap and become one image (e.g., such that the first image (Screen1) 10-1 and the second image (Screen2) 10-2 are not dislocated from each other).

In an embodiment, the processor 140 may adjust the brightness, the projection location, and the like of the first image (Screen1) 10-1 and the second image (Screen2) 10-2, in order to provide one image according to the (seamless) overlapping of the first image (Screen1) 10-1 and the second image (Screen2) 10-2. For example, in the area in which the first image (Screen1) 10-1 and the second image (Screen2) 10-2 overlap, the brightness of each of the first image (Screen1) 10-1 and the second image (Screen2) 10-2 may overlap and, thus, the brightness of the area may be emphasized. Accordingly, a problem in that a distorted image is provided may occur.

The processor 140, according to an embodiment, may adjust the brightness (e.g., decrease the brightness) of the area wherein the first image (Screen1) 10-1 and the second image (Screen2) 10-2 overlap, and provide an image such that the brightness of the overlapped area is substantially similar and/or the same as (e.g., a brightness difference is within a threshold value) the brightness of the remaining areas (e.g., the remaining areas excluding the area wherein the second image (Screen2) 10-2 is overlapped inside the first image (Screen1) 10-1) even if the second image (Screen2) 10-2 is overlapped inside the first image (Screen1) 10-1.

Figure 9:
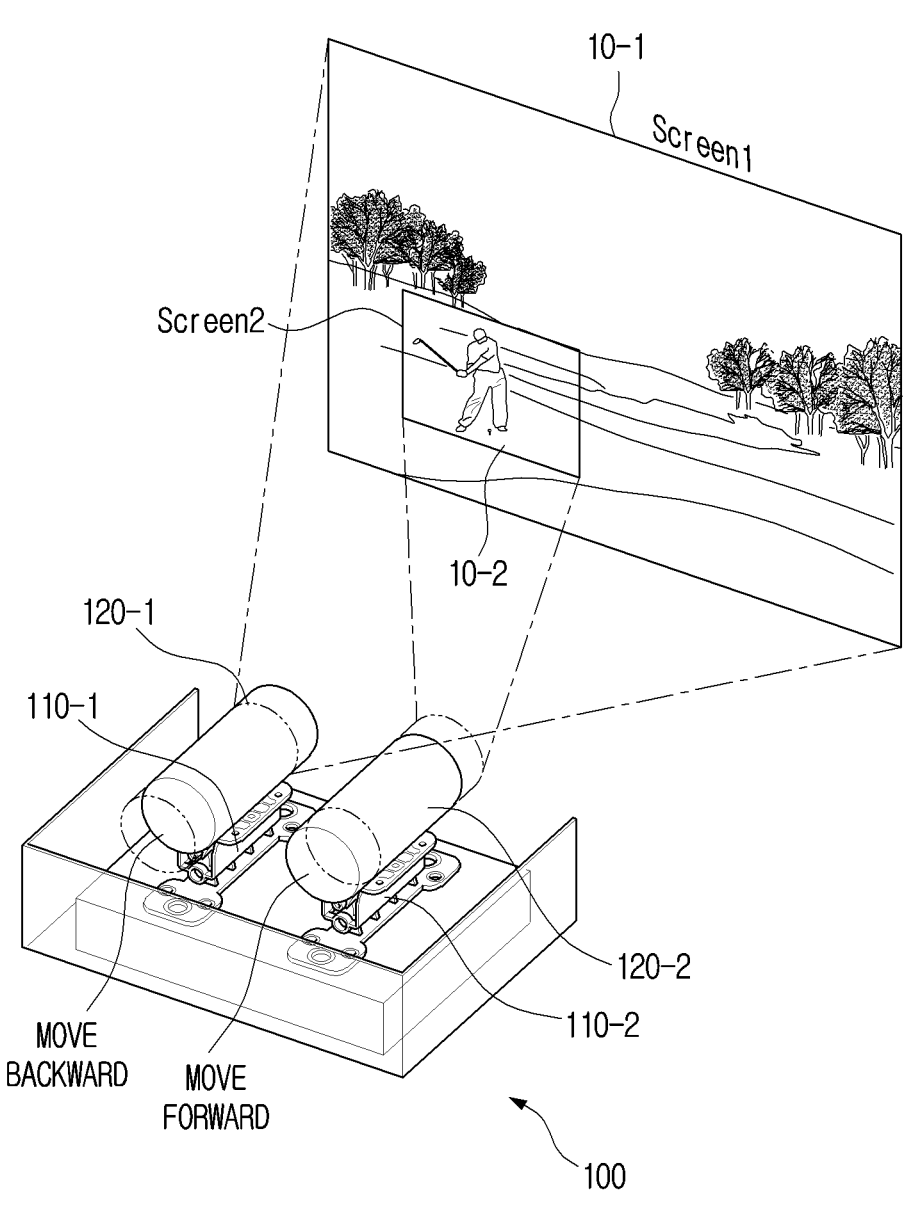
FIG. 9 is a diagram illustrating an operation of a driving part, according to an embodiment of the disclosure.

FIG. 9 is a diagram illustrating an operation of a driving part, according to an embodiment.

In an embodiment, each of the first driving part 110-1 and the second driving part 110-2 may rotate in at least one direction from among the four directions (e.g., up, down, left, and right). However, the present disclosure may not be limited thereto.

For example, as shown in FIG. 9, the processor 140 may control each of the first driving part 110-1 and the second driving part 110-2 to move forward and/or to move backward by a specific distance.

That is, the processor 140 may control the first driving part 110-1 to move backward (e.g., away from the projected image) in order to reduce (e.g., make smaller) the size of the first image (Screen1) 10-1 projected by the first projection part 120-1. Alternatively or additionally, the processor 140 may control the first driving part 110-1 to move forward (e.g., toward the projected image) in order to enlarge (e.g., make bigger) the size of the first image (Screen1) 10-1.

Alternatively or additionally, the processor 140 may control the second driving part 110-2 to move backward (e.g., away from the projected image) in order to reduce (e.g., make smaller) the size of the second image (Screen2) 10-2 projected by the second projection part 120-2. Alternatively or additionally, the processor 140 may control the second driving part 110-2 to move forward (e.g., toward the projected image) in order to enlarge (e.g., make bigger) the size of the second image (Screen2) 10-2.

Although FIG. 9 shows a case of a partial overlay screen layout in which each of the first driving part 110-1 and the second driving part 110-2 may move forward and/or backward, the present disclosure may not be limited thereto.

For example, in the case of an array screen layout, the processor 140 may control each of the first driving part 110-1 and the second driving part 110-2 to move forward and/or backward independently, in order to control the size of each of the first portion 10-1 (e.g., the first image portion) and the second portion 10-2 (e.g., the second image portion).

For another example, in the case of an overlay screen layout, the processor 140 may control each of the first driving part 110-1 and the second driving part 110-2 to move forward and/or backward independently, in order to control the size of each of the first image (Screen1) 10-1 and the second image (Screen2) 10-2.

Figure 10:
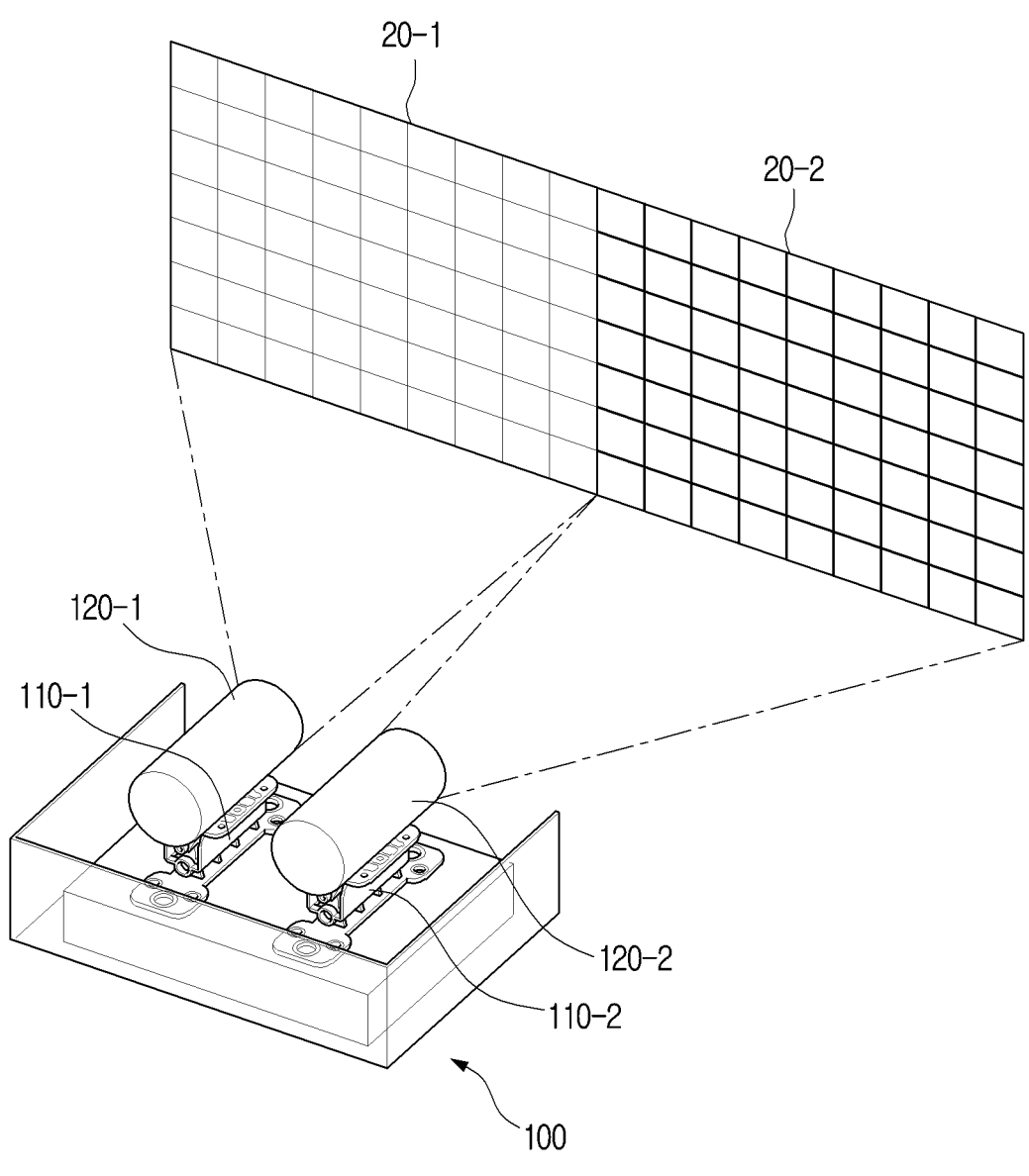
FIG. 10 is a diagram illustrating calibration of a plurality of projection parts, according to an embodiment of the disclosure.

FIG. 10 is a diagram illustrating calibration of a plurality of projection parts, according to an embodiment.

Referring to FIGS. 3 and 10, in operation S310, the processor 140 may perform calibration of the first projection part 120-1 (Project 1) and the second projection part 120-2 (Project 2).

For example, the processor 140 may control the first projection part 120-1 to output the first pattern image 20-1 to the first projection location. Alternatively or additionally, the processor 140 may control the second projection part 120-2 to output the second pattern image 20-2 to the second projection location.

The image output apparatus 100, according to an embodiment, may include a sensor (not shown). The image output apparatus 100 may detect, through the sensor, the first pattern image 20-1 output by the first projection part 120-1 and the second pattern image 20-2 output by the second projection part 120-2.

In an embodiment, the processor 140 may detect the first projection location corresponding to the first projection part 120-1 based on the first pattern image 20-1 detected by the sensor. Alternatively or additionally, the processor 140 may detect the second projection location corresponding to the second projection part 120-2 based on the second pattern image 20-2 detected by the sensor.

In an optional or additional embodiment, the processor 140 may perform calibration of the first projection part 120-1 (Project 1) and the second projection part 120-2 (Project 2) based on the first pattern image 20-1 and the second pattern image 20-2 detected by the sensor, respectively. For example, the processor 140 may perform processing operations on the first pattern image and/or the second pattern image, such as, but not limited to, lens shift, color matching, edge blending, keystone correction, leveling correction (e.g., horizontal correction), focus correction, and the like.

The processor 140, according to an embodiment, may re-perform the calibration in the operation S310 according to the screen layout identified in operation S330. That is, the processor 140 may perform a calibration operation as described with reference to operation S310 as part of operation S330 after identifying a screen layout corresponding to the context information.

For example, if an array screen layout is identified in operation S330, the processor 140 may re-perform operation S310, and rotate (and/or move forward and/or backward) each of the first driving part 110-1 and the second driving part 110-2 in order to adjust each of the first projection location and the second projection location, respectively, to correspond to the array screen layout.

In such an example, the processor 140 may detect, through the sensor, the first pattern image 20-1 projected by the first projection part 120-1 and the second pattern image 20-2 projected by the second projection part 120-2, and identify the rotation parameter of the first driving part 110-1 and the rotation parameter of the second driving part 110-2 based on the first location information of the detected first pattern image 20-1 and the second location information of the detected second pattern image 20-2.

Furthermore, the processor 140 may adjust the first projection location by rotating the first driving part 110-1 according to the rotation parameter of the first driving part 110-1, and/or adjust the second projection location by rotating the second driving part 110-2 according to the rotation parameter of the second driving part 110-2.

Although FIG. 10 shows an array screen layout for performing the calibration, the present disclosure may not be limited thereto.

For another example, if an overlay screen layout (and/or a partial overlay screen layout) is identified in operation S330, the processor 140 may re-perform the operation S310, and rotate (and/or, move forward and/or backward) each of the first driving part 110-1 and the second driving part 110-2 in order to adjust each of the first projection location and the second projection location, respectively, to correspond to the overlay screen layout.

In an embodiment, the processor 140 may set any one of the first projection part 120-1 and the second projection part 120-2 as a master, and may set the other projection part as a slave.

For example, the image output apparatus 100 may compare the identification information (e.g., the specification information) of each of the first projection part 120-1 and the second projection part 120-2, and set one of projection parts as the master, and set the other projection part as the slave based on the comparison result. For example, the processor 140 may compare a first brightness of the first projection part 120-1 with a second brightness of the second projection part 120-2 and set the projection part that may output an image of relatively higher brightness as the master, and set the other projection part as the slave. The identification information may refer to the features and/or specifications (e.g., brightness (e.g., ANSI-Lumens), contrast ratio, resolution, and the like) of the components constituting the apparatus. However, the disclosure may not be limited thereto. For example, the processor 140 may randomly set any one of the first projection part 120-1 or the second projection part 120-2 as the master, and set the other projection part as the slave.

In an embodiment, if the first projection part 120-1 is set as the master and the second projection part 120-2 is set as the slave, the processor 140 may control the first projection part 120-1 to project the background, and may control the second projection part 120-2 to project an image including a specific object in the partial overlay screen layout. However, the disclosure may not be limited thereto. For example, if the first projection part 120-1 is set as the master and the second projection part 120-2 is set as the slave, the processor 140 may control the first projection part 120-1 to project an image including a specific object, and may control the second projection part 120-2 to project the background in the partial overlay screen layout.

FIG. 11 is a flow chart illustrating a control method of an image output apparatus, according to an embodiment.

According to an embodiment, in a control method of an image output apparatus 100, an input image may be analyzed and context information of the input image may be identified (operation S1110).

In operation S1120, any one of a plurality of screen layouts may be identified based on the identified context information.

The first driving part may be controlled such that the first projection part, provided on the image output apparatus 100, projects an image to the first projection location, and the second driving part may be controlled such that the second projection part, provided on the image output apparatus 100, projects an image to the second projection location, according to the identified screen layout (operation S1130).

In an embodiment, each of the first driving part and the second driving part may include a PTZ motor. In such an embodiment, the operation S1130 may include the steps of identifying a rotation parameter of the first driving part for adjusting the first projection location and a rotation parameter of the second driving part for adjusting the second projection location according to the identified screen layout, adjusting the first projection location by rotating the PTZ motor of the first driving part in at least one direction from among four directions based on the rotation parameter of the first driving part, and adjusting the second projection location by rotating the PTZ motor of the second driving part in at least one direction from among four directions based on the rotation parameter of the second driving part.

In an embodiment, the plurality of screen layouts may include an array screen layout in which the first projection location of the first projection part and the second projection location of the second projection part are arranged in adjacent locations to each other. In such an embodiment, the operation S1130 may further include the step of, based on the array screen layout being identified from among the plurality of screen layouts based on the identified context information, controlling the first driving part such that the first projection part projects a first part of the input image to the first projection location and controlling the second driving part such that the second projection part projects a second part of the input image to the second projection location, according to the identified array screen layout.

In an embodiment, the plurality of screen layouts may include an overlay screen layout in which the first projection location of the first projection part and the second projection location of the second projection part may be substantially similar and/or may be the same locations. In such an embodiment, the operation S1130 may include the step of, based on the overlay screen layout being identified from among the plurality of screen layouts based on the identified context information, controlling the first driving part such that the first projection part projects the input image to the first projection location and controlling the second driving part such that the second projection part projects the input image to an identical location to the first projection location, according to the identified overlay screen layout.

The control method, according to an embodiment, may further include the steps of applying a first tone map curve to the input image and acquiring a first image of which luminance was adjusted, applying a second tone map curve to the input image and acquiring a second image of which luminance was adjusted, controlling the first projection part to output the first image, and controlling the second projection part to output the second image.

The plurality of screen layouts, according to an embodiment, may include a partial overlay screen layout in which the first projection location of the first projection part may be overlayed in one area inside the second projection location of the second projection part. In such an embodiment, the control method may further include the step of, based on the partial overlay screen layout being identified among the plurality of screen layouts based on the identified context information, identifying the first part including a specific object among a plurality of objects included in the input image and the second part including the remaining objects according to the partial overlay screen layout. In such an embodiment, the operation S1130 may further include the step of controlling the first driving part such that the first projection part projects the first part of the input image to the first projection location and controlling the second driving part such that the second projection part projects the second part of the input image to the second projection location.

In an embodiment, the operation S1130 may further include the steps of controlling the second driving part such that the projection location of the second part is maintained, and controlling the first driving part such that the projection location of the first part is moved inside the second projection location according to the motion of the specific object.

Alternatively or additionally, the specific object included in the first part may include at least one of a character object controlled by a user manipulation and/or a main object that may interact according to a user manipulation. The second part may be a background included in the input image.

The context information of the input image, according to an embodiment, may include at least one of resolution information, luminance information, depth map information, object map information, and peak highlight map information of the input image.

The control method, according to an embodiment, may further include the steps of controlling the first projection part to output a first pattern image to the first projection location, controlling the second projection part to output a second pattern image to the second projection location, identifying first location information of the first pattern image output by the first projection part and second location information of the second pattern image output by the second projection part through a sensor provided on the image output apparatus, and identifying a rotation parameter of the first driving part and a rotation parameter of the second driving part for adjusting the first projection location and the second projection location based on the identified screen layout, the first location information, and the second location information.

It may be apparent that various embodiments of the present disclosure may not only be applied to an image apparatus, but may also be applied to various electronic apparatuses that may output images.

The various embodiments described above may be implemented in a recording medium that may be read by a computer and/or an apparatus similar to a computer, by using software, hardware, or a combination thereof. In some cases, the embodiments described in the present disclosure may be implemented as a processor itself. According to implementation by software, the embodiments such as processes and functions described in the present disclosure may be implemented as separate software modules. Each of the software modules may perform one or more functions and operations described in the present disclosure.

Computer instructions for performing processing operations of an electronic apparatus according to various embodiments of the present disclosure may be stored in a non-transitory computer-readable medium. Computer instructions stored in such a non-transitory computer-readable medium may perform the processing operations of the image output apparatus 100 according to various embodiments performed by a specific machine, when the instructions are executed by the processor of the specific machine.

A non-transitory computer-readable medium may refer to a medium that stores data semi-permanently, and is readable by machines, but not a medium that stores data for a short moment such as a register, a cache, and a memory. As specific examples of a non-transitory computer-readable medium, there may be a compact disc (CD), a digital versatile disc (DVD), a hard disc, a blue-ray disc, a USB, a memory card, a ROM, and the like.

While embodiments of the present disclosure have been shown and described, the present disclosure is not limited to the aforementioned embodiments. For example, it may be apparent that various modifications may be made by those having ordinary skill in the technical field to which the disclosure belongs, without departing from the scope of the present disclosure as claimed by the appended claims. Further, it is intended that such modifications are not to be interpreted independently from the technical idea or prospect of the disclosure.

What is claimed is:

1. An image output apparatus, comprising:
a communication interface configured to perform communication with external apparatuses;
a first projector;
a second projector;
a first driver configured to adjust a first projection location of the first projector;
a second driver configured to adjust a second projection location of the second projector; and
at least one processor configured to:
identify context information of an input image received through the communication interface;
select, based on the context information, a screen layout from among a plurality of screen layouts comprising at least one array screen layout and at least one overlay screen layout;
control, according to the screen layout, the first driver such that the first projector projects a first image to the first projection location; and
control, according to the screen layout, the second driver such that the second projector projects a second image to the second projection location.

2. The image output apparatus of claim 1, wherein each of the first driver comprises a first pan, tilt, zoom (PTZ) motor and the second driver comprises a second PTZ motor, and
wherein the at least one processor is further configured to:
identify, according to the screen layout, a first rotation parameter of the first driver for adjusting the first projection location and a second rotation parameter of the second driver for adjusting the second projection location;
adjust the first driver such that the first projector projects to the first projection location by rotating, based on the first rotation parameter, the first PTZ motor of the first driver in at least one first direction from among four directions; and
adjust the second driver such that the second projector projects to the second projection location by rotating, based on the second rotation parameter, the second PTZ motor of the second driver in at least one second direction from among the four directions.

3. The image output apparatus of claim 2, wherein the plurality of screen layouts comprises an array screen layout, wherein the first projection location of the first projector and the second projection location of the second projector are arranged in adjacent locations to each other, and
wherein the at least one processor further is configured to:
based on the array screen layout being the screen layout, control the first driver such that the first projector projects a first portion of the input image to the first projection location, and control the second driver such that the second projector projects a second portion of the input image to the second projection location.

4. The image output apparatus of claim 2, wherein the plurality of screen layouts comprises an overlay screen layout, wherein the first projection location of the first projector matches the second projection location of the second projector, and
wherein the at least one processor is further configured to:

based on the overlay screen layout being the screen layout, control the first driver such that the first projector projects the input image to the first projection location, and control the second driver such that the second projector projects the input image to the second projection location matching the first projection location.

5. The image output apparatus of claim 4, wherein the at least one processor is further configured to:
apply a first tone map curve to the input image and acquire a first adjusted image having an adjusted luminance;
apply a second tone map curve to the input image and acquire a second adjusted image having an adjusted luminance;
control the first projector to output the first adjusted image, and
control the second projector to output the second adjusted image.

6. The image output apparatus of claim 1, wherein the plurality of screen layouts comprises a partial overlay screen layout, wherein the first projection location of the first projector is overlayed in an overlay area inside the second projection location of the second projector, and
wherein the at least one processor is further configured to:
based on the partial overlay screen layout being the screen layout, identify a first portion of the input image comprising a first object from among a plurality of objects comprised in the input image and a second portion comprising remaining objects of the plurality of objects;
control the first driver such that the first projector projects the first portion of the input image to the first projection location; and
control the second driver such that the second projector projects the second portion of the input image to the second projection location.

7. The image output apparatus of claim 6, wherein the at least one processor is further configured to:
control the second driver such that the second projection location of the second portion is maintained, and
control the first driver such that the first projection location of the first portion is moved inside the second projection location, according to a motion of the first object.

8. The image output apparatus of claim 7, wherein the first object comprises at least one of a character object controlled by a user manipulation and a main object that interacts with a user according to the user manipulation, and
wherein the second portion comprises a background image of the input image.

9. The image output apparatus of claim 1, wherein the context information of the input image comprises at least one of resolution information, luminance information, depth map information, object map information, or peak highlight map information of the input image.

10. The image output apparatus of claim 1, further comprising:
a sensor,
wherein the at least one processor is further configured to:
control the first projector to output a first pattern image to the first projection location;
control the second projector to output a second pattern image to the second projection location;
identify, through the sensor, first location information of the first pattern image and second location information of the second pattern image; and identify a first rotation parameter of the first driver for adjusting the first projection location and a second rotation parameter of the second driver for adjusting the second projection location based on the screen layout, the first location information, and the second location information.

11. A control method of an image output apparatus, the control method comprising:

identifying context information of an input image;

selecting, based on the context information, a screen layout from among a plurality of screen layouts comprising at least one array screen layout and at least one overlay screen layout;

controlling, according to the screen layout, a first driver of the image output apparatus such that a first projector of the image output apparatus projects a first image to a first projection location; and controlling, according to the screen layout, a second driver of the image output apparatus such that a second projector of the image output apparatus projects a second image to a second projection location.

12. The control method of claim 11, further comprising:

determine, according to the screen layout, a first rotation parameter of the first driver for adjusting the first projection location and a second rotation parameter of the second driver for adjusting the second projection location;

adjusting the first driver such that the first projector projects to the first projection location by rotating, based on the first rotation parameter, a first pan, tilt, zoom (PTZ) motor of the first driver in at least one first direction among four directions; and adjusting the second driver such that the second projector projects to the second projection location by rotating, based on the second rotation parameter, a second PTZ motor of the second driver in at least one second direction among the four directions.

13. The control method of claim 12, wherein the plurality of screen layouts comprises an array screen layout wherein the first projection location of the first projector and the second projection location of the second projector are arranged in adjacent locations to each other, wherein the controlling the first driver comprises, based on the array screen layout being the screen layout, controlling the first driver such that the first projector projects a first portion of the input image to the first projection location, and wherein the controlling the second driver comprises, based on the array screen layout being the screen layout, controlling the second driver such that the second projector projects a second portion of the input image to the second projection location.

14. The control method of claim 12, wherein the plurality of screen layouts comprises an overlay screen layout wherein the first projection location of the first projector matches the second projection location of the second projector, wherein the controlling the first driver comprises, based on the overlay screen layout being the screen layout, controlling the first driver such that the first projector projects the input image to the first projection location, and wherein the controlling the second driver comprises, based on the overlay screen layout being the screen layout, controlling the second driver such that the second projector projects the input image to the second projection location matching the first projection location.

15. The control method of claim 14, further comprising:

applying a first tone map curve to the input image and acquiring a first adjusted image having an adjusted luminance;

applying a second tone map curve to the input image and acquiring a second adjusted image having an adjusted luminance;

controlling the first projector to output the first adjusted image; and controlling the second projector to output the second adjusted image.

16. The control method of claim 11, wherein the plurality of screen layouts comprises a partial overlay screen layout, wherein the first projection location of the first projector is overlayed in an overlay area inside the second projection location of the second projector, wherein the controlling the first driver comprises, based on the partial overlay screen layout being the screen layout, controlling the first driver such that the first projector projects a first portion of the input image to the first projection location, the first portion of the input image comprising a first object from among a plurality of objects comprised in the input image, and wherein the controlling the second driver comprises, based on the partial overlay screen layout being the screen layout, controlling the second driver such that the second projector projects a second portion of the input image to the second projection location, the second portion of the input image comprising remaining objects of the plurality of objects comprised in the input image.

17. The control method of claim 16, wherein the first object comprises at least one of a character object controlled by a user manipulation and a main object that interacts with a user according to the user manipulation, wherein the second portion comprises a background image of the input image, and wherein the control method further comprises:

controlling the second driver such that the second projection location of the second portion is maintained; and controlling the first driver such that the first projection location of the first portion is moved inside the second projection location, according to a motion of the first object.

18. The control method of claim 11, wherein the context information of the input image comprises at least one of resolution information, luminance information, depth map information, object map information, and peak highlight map information of the input image.

19. The control method of claim 11, further comprising:

controlling the first projector to output a first pattern image to the first projection location;

controlling the second projector to output a second pattern image to the second projection location;

identifying, through a sensor of the image output apparatus, first location information of the first pattern image and second location information of the second pattern image; and identifying a first rotation parameter of the first driver for adjusting the first projection location and a second rotation parameter of the second driver for adjusting the second projection location based on the screen layout, the first location information, and the second location information.

20. An image output apparatus comprising:

a communication interface configured to perform communication with external apparatuses;

a first projector;

a second projector;

a first driver comprising a first pan, tilt, zoom (PTZ) motor, and configured to adjust a first projection location of the first projector;

a second driver comprising a second PTZ motor, and configured to adjust a second projection location of the second projector;

a sensor;

a memory storing instructions; and at least one processor communicatively coupled to the memory, wherein the at least one processor is configured to execute the instructions to:

analyze an input image received through the communication interface;

identify, based on the analysis, context information of the input image;

select a screen layout from a plurality of screen layouts, based on the context information;

control the first projector to output a first pattern image;

control the second projector to output a second pattern image;

identify, through the sensor, first location information of the first pattern image and second location information of the second pattern image;

identify a first rotation parameter of the first driver for adjusting the first projection location and a second rotation parameter of the second driver for adjusting the second projection location based on the screen layout, the first location information, and the second location information;

adjust the first driver such that the first projector projects to the first projection location by rotating, based on the first rotation parameter, the first PTZ motor of the first driver in at least one first direction from among four directions;

adjust the second driver such that the second projector projects to the second projection location by rotating, based on the second rotation parameter, the second PTZ motor of the second driver in at least one second direction from among the four directions;

control, according to the screen layout, the first driver such that the first projector projects a first image to the first projection location; and control, according to the screen layout, the second driver such that the second projector projects a second image to the second projection location.

* * * * *